US008513155B2

(12) United States Patent
Li et al.

(10) Patent No.: US 8,513,155 B2
(45) Date of Patent: Aug. 20, 2013

(54) PEROVSKITE-TYPE COMPOUNDS FOR USE IN LEAN $NO_x$ TRAPS

(75) Inventors: Wei Li, Troy, MI (US); Chang H Kim, Rochester, MI (US); Gongshin Qi, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 150 days.

(21) Appl. No.: 12/713,803

(22) Filed: Feb. 26, 2010

(65) Prior Publication Data

US 2010/0229533 A1 Sep. 16, 2010

Related U.S. Application Data

(60) Provisional application No. 61/160,523, filed on Mar. 16, 2009.

(51) Int. Cl.
*B01D 50/00* (2006.01)
*B01D 53/34* (2006.01)
*B01J 23/00* (2006.01)
*B01J 21/00* (2006.01)
*B01J 20/00* (2006.01)

(52) U.S. Cl.
USPC .......... 502/333; 502/65; 502/66; 502/73; 502/74; 502/87; 502/302; 502/303; 502/304; 502/324; 502/325; 502/326; 502/327; 502/328; 502/330; 502/339; 502/340; 502/341; 502/355; 502/415; 502/439; 502/527.12; 502/527.13; 502/525; 422/177; 422/180

(58) Field of Classification Search
USPC ............ 502/65, 66, 73, 74, 87, 302–304, 502/324–328, 330, 333, 339–341, 355, 415, 502/439, 527.12, 527.13, 525; 422/177, 422/180
See application file for complete search history.

(56) References Cited

U.S. PATENT DOCUMENTS

| | | | | |
|---|---|---|---|---|
| 5,447,705 A * | 9/1995 | Petit et al. | ........... | 423/418.2 |
| 5,562,888 A * | 10/1996 | Rajadurai | ........... | 423/239.1 |
| 6,352,955 B1 * | 3/2002 | Golden | ........... | 502/302 |
| 6,531,425 B2 * | 3/2003 | Golden | ........... | 502/302 |
| 7,071,141 B2 * | 7/2006 | Gandhi et al. | ........... | 502/302 |
| 7,189,376 B2 * | 3/2007 | Kumar et al. | ........... | 422/177 |
| 7,375,054 B2 * | 5/2008 | Eguchi et al. | ........... | 502/330 |
| 7,381,394 B2 * | 6/2008 | Tanaka et al. | ........... | 423/593.1 |
| 7,514,055 B2 * | 4/2009 | Golden | ........... | 423/213.2 |
| 7,524,465 B2 * | 4/2009 | Kumar et al. | ........... | 422/180 |
| 7,641,875 B1 * | 1/2010 | Golden | ........... | 423/213.5 |
| 7,718,562 B2 * | 5/2010 | Gandhi et al. | ........... | 502/66 |
| 2003/0039597 A1 * | 2/2003 | Deeba et al. | ........... | 422/177 |

(Continued)

OTHER PUBLICATIONS

Zhu et al., The Reaction and Poisoning Mechanism of SO2 and Perovskite LaCoO3 Film Model Catalysts; Applied Catalysis A: General 209 (2001) pp. 71-77.

(Continued)

*Primary Examiner* — Cam N. Nguyen
(74) *Attorney, Agent, or Firm* — BrooksGroup

(57) ABSTRACT

An exhaust aftertreatment system for a lean-burn engine may include a lean $NO_X$ trap that comprises a catalyst material. The catalyst material may remove $NO_X$ gases from the engine-out exhaust emitted from the lean-burn engine. The catalyst material may include a $NO_X$ oxidation catalyst that comprises a perovskite compound.

15 Claims, 4 Drawing Sheets

(56) References Cited

U.S. PATENT DOCUMENTS

| | | | |
|---|---|---|---|
| 2006/0034740 A1* | 2/2006 | Li et al. | 423/213.5 |
| 2006/0034741 A1* | 2/2006 | Li et al. | 423/213.5 |
| 2006/0223694 A1* | 10/2006 | Gandhi et al. | 502/60 |
| 2006/0245985 A1* | 11/2006 | Harada et al. | 422/177 |
| 2007/0006578 A1* | 1/2007 | Tanaami et al. | 60/299 |
| 2007/0105715 A1* | 5/2007 | Suda et al. | 502/303 |
| 2008/0256936 A1* | 10/2008 | Zuberi | 60/299 |
| 2008/0260610 A1* | 10/2008 | Theis et al. | 423/213.2 |

OTHER PUBLICATIONS

Cheng et al., Stability of Materials as Candidates for Sulfur-Resistant Anodes of Solid Oxide Fuel Cells; Journal of the Electrochemical Society, 153 (7), 2006, pp. A1302-A1309.

Wang et al., Study on the Poisoning Mechanism of Sulfur Dioxide for Perovskite La0.9Sr0.1CoO3 Model Catalysts; Catalysis Letters, vol. 82, No. 3-4, Oct. 2002, pp. 199-204.

Alifanti et al., Activity in Methane Combustion and Sensitivity to Sulfur Poisoning of La1-xCexMn1-yCoyO3 Perovskite Oxides, Applied Catalysis B: Environmental 41 (2003), pp. 71-81.

Tanaka et al., Advances in Designing Perovskite Catalysts; Current Opinion in Solid State and Materials Science, vol. 5, 2001, pp. 381-387.

U.S. Appl. No. 12/571,606, filed Oct. 1, 2009, Washcoating Technique for Perovskite Catalyst, Chang H. Kim.

U.S. Appl. No. 12/563,345, filed Sep. 21, 2009, Method and Architecture for Oxidizing Nitric Oxide in Exhaust Gas From Hydrocarbon Fuel Source With a Fuel Lean Combustion Mixture, Chang H. Kim.

U.S. Appl. No. 12/720,158, filed Mar. 9, 2010, Sulfur Tolerant Perovskite Supported Catalysts, Chang H. Kim.

* cited by examiner

PEROVSKITE-TYPE COMPOUNDS FOR USE IN LEAN $NO_x$ TRAPS

CROSS-REFERENCES TO RELATED APPLICATIONS

This Application claims the benefit of U.S. Provisional Application No. 61/160,523, filed on Mar. 16, 2009, the disclosure of which is hereby incorporated by reference in its entirety.

TECHNICAL FIELD

The technical field relates generally to exhaust aftertreatment systems and, more particularly, to a catalyst material for use in a lean $NO_X$ trap.

BACKGROUND

A lean-burn engine may be supplied with a lean mixture of air and fuel (oxygen-rich mixture) as a means to improve vehicle fuel economy. The engine-out exhaust emitted from such engines during periods of lean-burn operation may include a relatively high content of oxygen ($O_2$), a relatively low content of carbon monoxide (CO) and unburned/partially-burned hydrocarbons (hereafter HC's), and small amounts of nitrogen oxides primarily comprised of NO and $NO_2$ (collectively referred to as $NO_X$ gases). The concentration of several of these gaseous emissions, however, may need to be decreased to the greatest extent feasible before the engine-out exhaust is expelled to the atmosphere from the vehicle's tailpipe. To this end, an exhaust aftertreatment system may be installed downstream of the vehicle engine to control and reduce the various unwanted emissions and particulate matter contained in the engine-out exhaust. A typical exhaust aftertreatment system usually aspires to (1) oxidize CO into carbon dioxide ($CO_2$), (2) oxidize HC's into $CO_2$ and water ($H_2O$), (3) convert $NO_X$ gases into nitrogen ($N_2$) and $O_2$, and remove any other unwanted matter.

Traditional catalytic converters outfitted with a three-way catalyst (TWC) have been implemented in many exhaust aftertreatment system designs. The TWO generally includes some combination of platinum group metals (PGM) that can simultaneously oxidize CO and HC's and reduce $NO_X$ gases. Catalytic converters of this kind have been known to function quite effectively when the engine operates with a stoichiometric mixture of air and fuel. This is because the engine-out exhaust generated from the combustion of a stoichiometric air/fuel mixture generally includes an appropriate balance of reductants (CO, HC's, and $H_2$) and oxidants ($O_2$) to concurrently reduce the $NO_X$ gases and oxidize any CO and NC's through various coupled catalytic reactions. But TWC-equipped catalytic converters are generally not able to efficiently reduce $NO_X$ gases when the engine operates with a lean mixture of air and fuel. The low levels of reductants and the high $O_2$ content in the engine-out exhaust make such a reaction kinetically unfavorable in most instances.

A lean $NO_X$ trap, or LNT, is but one available option that may be employed in the exhaust aftertreatment system to help remove $NO_X$ gases contained in the engine-out exhaust of a lean-burn engine. A LNT generally operates by feeding the engine-out exhaust expelled from the lean-burn engine across and/or through an LNT catalyst material that exhibits $NO_X$ gas trapping and conversion capabilities. The LNT catalyst material oxidizes NO to $NO_2$ and simultaneously traps or "stores" $NO_2$ as a nitrate species when the lean-burn engine is combusting a lean mixture of air and fuel. The efficiency of $NO_X$ gas removal and storage may be enhanced, in some instances, by increasing the proportion of $NO_2$ in the total $NO_X$ emission so as to reduce the oxidative demand (NO to $NO_2$) on the LNT catalyst material. The $NO_X$ storage capacity of the LNT catalyst material, however, is not unlimited and at some point may need to be regenerated or purged of the $NO_X$-derived nitrate compounds. The LNT catalyst material may be regenerated by momentarily switching the mixture of air and fuel supplied to the lean-burn engine from lean to rich. The resultant delivery of a rich-burn engine-out exhaust to the LNT catalyst material causes the $NO_X$-derived nitrate compounds to become thermodynamically unstable which, in turn, triggers the release of $NO_X$ gases and regenerates future $NO_X$ storage sites. The liberated $NO_X$ gases are then reduced, largely to $N_2$, by the excess reductants—such as CO, HC's and/or $H_2$— present in the rich-burn engine effluents. The overall conversion efficiency of some LNTs, aided by the appropriate cycling between a lean and rich mixture of air and fuel, have been shown to remove more than 90% of $NO_X$ gases contained in the engine-out exhaust of lean-burn engines over lengthy periods of time.

A conventional LNT typically includes a canister with an inlet that receives the engine-out exhaust emitted from the lean-burn engine and an outlet that delivers the engine-out exhaust from the canister. The canister may house a support body that communicates the engine-out exhaust from the inlet to the outlet over a catalyst material. The catalyst material is typically a mixture of PGMs and an alkali or alkaline earth metal compound dispersed within a high surface-area washcoat. The mixture of PGMs includes platinum, which catalyzes the oxidation of NO and to some extent the reduction of $NO_X$ gases, and rhodium, which primarily catalyzes the reduction of $NO_X$ gases. The alkali or alkaline earth metal compound provides trap sites for the reversible storage of $NO_2$ as a metal nitrate. Of these various materials dispersed in the washcoat, platinum is usually present in the greatest amount. One specific LNT catalyst material known to skilled artisans includes an alumina washcoat appropriately loaded with platinum, rhodium, and barium oxide. But the use of platinum group metals, especially the relatively large amounts of platinum, in conventional LNT catalyst materials is rather expensive. Platinum has also shown a tendency to lose some catalytic activity when exposed to engine-out exhaust at higher operating temperatures.

The incorporation of a lean $NO_X$ trap into an exhaust aftertreatment system for a lean-burn engine is thus an attractive, yet challenging, option for removing unwanted emissions including $NO_X$ gases from the engine-out exhaust. Such technology is constantly in need of innovative developments and contributions that can help advance to this and other related fields of technological art.

SUMMARY OF EXEMPLARY EMBODIMENTS

An exhaust aftertreatment system for a lean-burn engine may include a lean $NO_X$ trap that comprises a catalyst material. The catalyst material may remove $NO_X$ gases from a flow of engine-out exhaust emitted from the lean-burn engine. The catalyst material may include a $NO_X$ oxidation catalyst that comprises a perovskite compound.

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the invention will become more fully understood from the detailed description and the accompanying drawings, wherein.

DETAILED DESCRIPTION OF EXEMPLARY EMBODIMENTS

The following description of the embodiment(s) is merely exemplary in nature and is in no way intended to limit the invention, its application, or uses.

A lean-burn engine that combusts a lean mixture of air and fuel may be fitted with an exhaust aftertreatment system to help reduce the concentration of certain unwanted emissions and particulate matter from its engine-out exhaust. Some gaseous emissions contained in the engine-out exhaust that may need to be removed include CO, HC's, and $NO_X$ gases. Catalytic converters that employ PGM metals have long been used to address this need. But the nature of the engine-out exhaust produced during lean-burn engine operation poses certain challenges for traditional catalytic converters. One specific challenge is that the relatively high content of $O_2$ and the relatively low content of CO and HC's in the engine-out exhaust renders the reaction kinetics for the conversion of $NO_X$ gases to $N_2$ over PGM metals quite unfavorable.

A lean $NO_X$ trap may therefore be incorporated into the exhaust aftertreatment system to help remove $NO_X$ gases from a flow of engine-out exhaust emanating from the lean-burn engine. The lean $NO_X$ trap may include a support body that comprises a surface over which at least a portion of the flow of engine-out exhaust passes. The support body may be a monolithic honeycomb structure, a wire mesh, a packed bed of many support particles, or any other feasible design. A catalyst material that comprises a $NO_X$ oxidation catalyst, a $NO_X$ storage catalyst, and a $NO_X$ reduction catalyst may be carried by the at least one surface of the support body. The $NO_X$ oxidation catalyst may include a perovskite compound. The use of platinum in the catalyst material of the lean $NO_X$ trap may, if desired, be substantially diminished or altogether eliminated as a corollary of the perovskite compound's $NO_X$ oxidation capabilities under lean-burn engine conditions.

Figure 1:
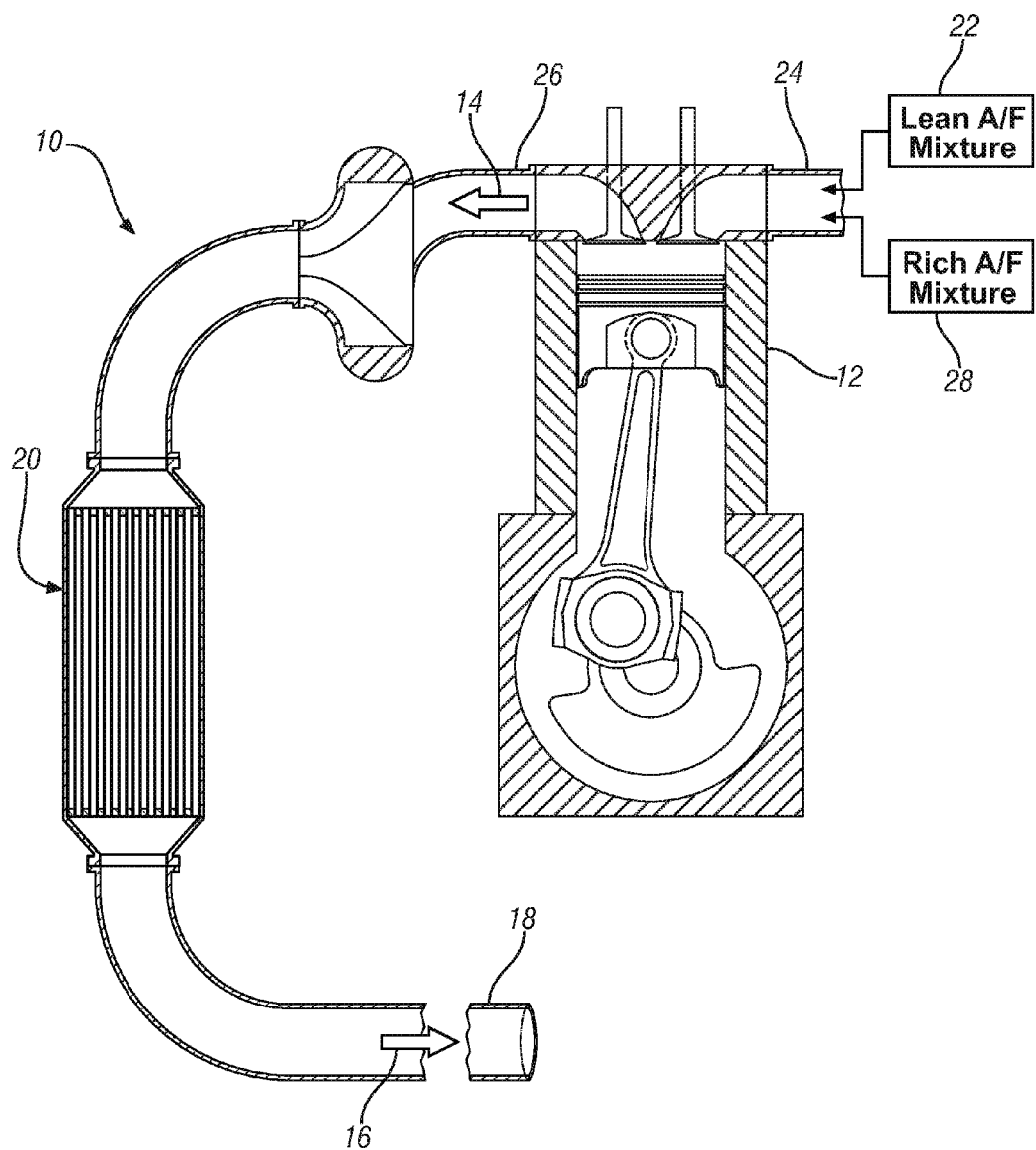
FIG. 1 is a schematic illustration of an exhaust aftertreatment system that includes a lean $NO_X$ trap according to one embodiment of the invention.

An exemplary and schematic illustration of the relevant parts of an exhaust aftertreatment system 10 for a vehicle powered by a lean-burn engine 12 is shown in FIG. 1. The exhaust aftertreatment system 10 receives a flow of engine-out exhaust 14 from the lean-burn engine 12 and communicates a flow of treated exhaust 16 towards a vehicle tailpipe 18 for expulsion to the atmosphere. The exhaust aftertreatment system 10 may include a lean $NO_X$ trap 20 to help remove $NO_X$ gases from the flow of engine-out exhaust 14. A variety of other devices, while not expressly shown in FIG. 1, may also be included in the exhaust aftertreatment system 10 to supplement the lean $NO_X$ trap's 20 $NO_X$ removal capabilities and/or remove other unwanted gaseous emissions and/or suspended particulate matter. These devices include, for example, a diesel oxidation catalyst, a TWC-based catalytic converter, and/or a diesel particulate filter. Other devices may also be located upstream or downstream of the exhaust aftertreatment system 10. An exhaust gas recirculation line may, for example, recirculate a portion of the flow of engine-out exhaust 14 in known fashion to help lower the $NO_X$ gas emissions from the lean-burn engine 12. As another example, at least a portion of the engine-out exhaust 14 may be directed through a turbocharger turbine to increase the intake pressure of the air supplied to the lean-burn engine 12. Skilled artisans will undoubtedly know of, and understand, these and the many other devices that may be included in and around the exhaust aftertreatment system 10.

The lean-burn engine 12 may be any engine that is constructed and designed to combust, at least some of the time, a lean mixture of air and fuel 22 (hereafter "lean A/F mixture"). The lean-burn engine 12 may be coupled to an inlet manifold 24 and an exhaust manifold 26. Some particular examples of engines that may be employed as the lean-burn engine 12 include, but are not limited to, a diesel engine, a spark ignition direct injection engine (SIDI), and a homogeneous charge compression ignition engine (HCCI). The general construction and functionality of these types of engines are known to skilled artisans and, as a result, need not be discussed in detail here. Other known engine types that are designed and/or constructed to operate in a lean-burn state may also be used.

The inlet manifold 24 may supply the lean A/F mixture 22 to the lean-burn engine 12 for combustion. The lean A/F mixture 22 generally contains more air than is stoichiometrically necessary to combust the fuel. For instance, the air to fuel mass ratio of the lean A/F mixture 22 may be greater than 14.6-14.8, which is the approximate stoichiometric air/fuel mass ratio range of many gasoline and diesel fuels. Indeed, in many instances, the air to fuel mass ratio of the lean A/F mixture 22 usually lies somewhere in the range of about 20-65 depending on the operating demands of the vehicle. The lean A/F mixture 22, however, may be momentarily and periodically switched to a rich mixture of air and fuel 28 (hereafter "rich A/F mixture") for any of a number of reasons. The air to fuel mass ratio of the rich A/F mixture 28 may be stoichiometric or less, and generally lies somewhere in the range of about 12-14. It should be noted that FIG. 1 identifies separate feeds of the lean A/F mixture 22 and the rich A/F mixture 28 for ease of description only. In actuality, the vehicle is most likely outfitted with a fuel injection system, an air induction system, and an A/F ratio control system that can accurately control the amount of air and fuel that is mixed together and simultaneously fed to the intake manifold 24. Reference to the lean A/F mixture 24 and the rich A/F mixture 28 is therefore intended as a description of the current state of the mixture of air and fuel being fed to the lean-burn engine 12 and not necessarily to distinct feed streams of air and fuel that are separately piped to the intake manifold 24.

The lean A/F mixture 22 or the rich A/F mixture 28, once introduced to the lean-burn engine 12, may be combusted to produce energy for powering the vehicle and engine-out exhaust comprised of combustion products and unreacted air and/or fuel. The engine-out exhaust generated from the combustion of the lean A/F mixture 22 generally comprises oxygen, carbon dioxide, carbon monoxide, HC's, $NO_X$ gases, possibly some particulate matter, and the balance nitrogen and water when the fuel is gasoline or diesel fuel. The $NO_X$ gas constituency of the engine-out exhaust may fluctuate between 50 and 1500 ppm and typically comprises greater than 90 wt. % NO and less than 10 wt. % $NO_2$. The $O_2$ content, which is relatively high, and the CO and HC's content, which are relatively low, promote an oxidizing environment in the engine-out exhaust. The engine-out exhaust generated from the combustion of the rich A/F mixture 28, on the other hand, generally comprises a higher content of CO and HC's and a much lower content of $O_2$ than the engine-out exhaust generated from the combustion of the lean A/F mixture 22. This shift in reductant and oxygen content in the engine-out exhaust, relative to that produced by the lean A/F mixture 22, promotes a reducing environment in the engine-out exhaust. A reducing environment can, of course, be induced and/or enhanced in the engine-out exhaust through other procedures not discussed here. The engine-out exhaust produced from either the lean A/F mixture 22 or the rich A/F mixture 28, which can reach temperatures of up to about 900° C., may ultimately be expelled from the lean-burn engine 12 through the exhaust manifold 26 as the flow of engine-out exhaust 14.

Figure 2:
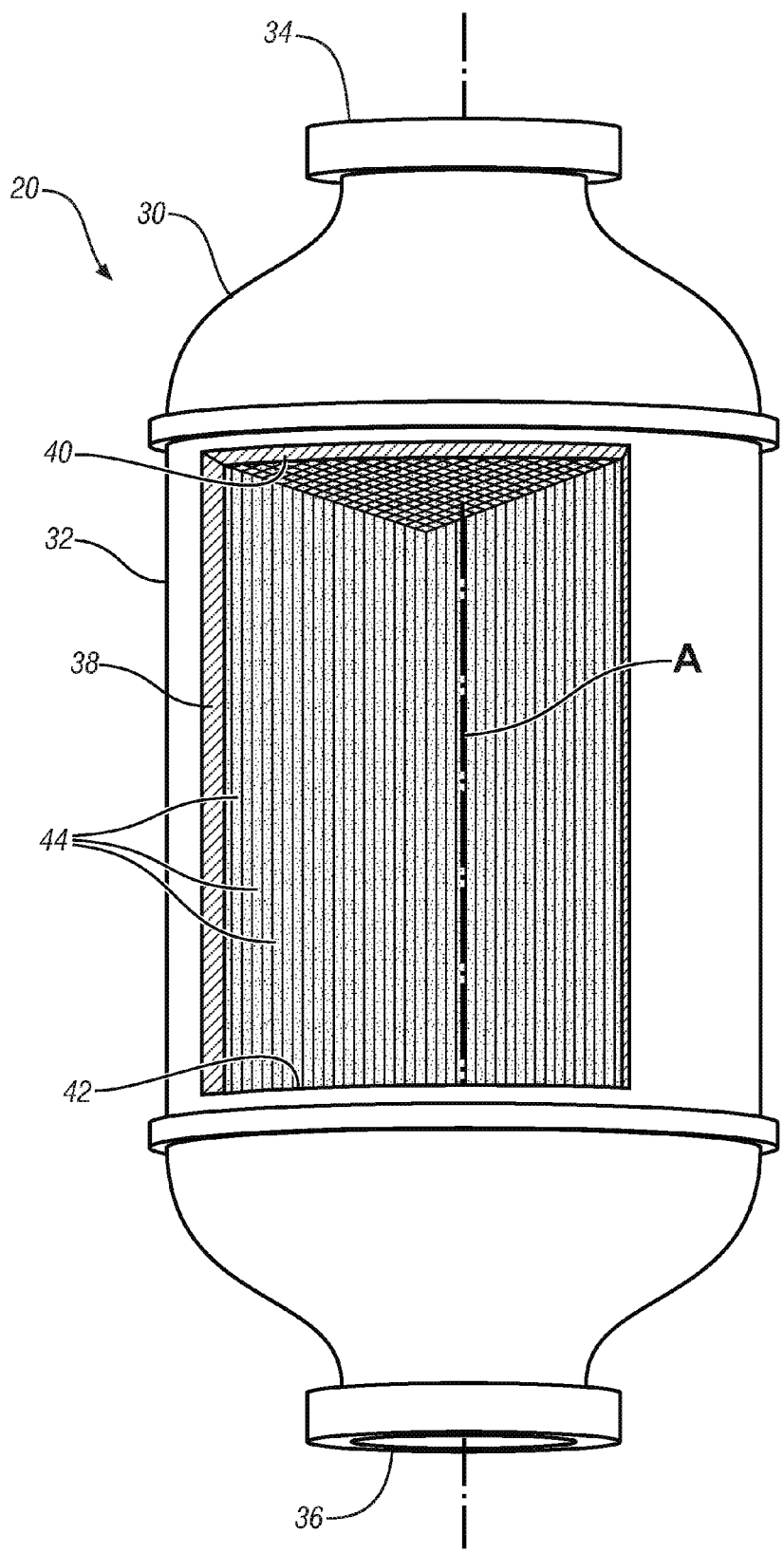
FIG. 2 is a perspective and partial cut-away view of an exemplary embodiment of a lean $NO_X$ trap that may be included in the exhaust aftertreatment system illustrated in FIG. 1.

The lean $NO_X$ trap 20, as shown best in FIG. 2, may comprise a canister 30 that includes a hollow chamber 32, an inlet 34, and an outlet 36. The hollow chamber 32 may be cylindrical in shape, as shown, or may assume any other desired geometry. The inlet 34 may fluidly communicate with the exhaust manifold 26 to receive the flow of engine-out exhaust 14. The outlet 36 may communicate the flow of engine-out exhaust 14 downstream of the lean $NO_X$ trap 20 for further treatment, if needed, and the eventual discharge from the exhaust aftertreatment system 10 as the flow of treated exhaust 16. The inlet 34 and the outlet 36 may be located on opposite ends of the hollow chamber 32, as shown, or in some other workable configuration. The canister 30 may be fabricated from stainless steel and joined with suitable piping to form a continuous flow path for communicating the flow of engine-out exhaust 14 through the hollow chamber 32 from the inlet 34 to the outlet 36 along a flow axis A.

A support body 38 that includes an inlet end 40 and an outlet end 42 may be housed in the hollow chamber 32. The inlet end 40 and the outlet end 42 of the support body 38 may be near the inlet 34 and the outlet 36 of the canister, respectively. The support body 38, as shown in partial cross-section, may be a monolithic honeycomb structure that fits tightly inside the hollow chamber 32. A plurality of flow-through cells 44, often numbering in the hundreds, may extend from the inlet end 40 to the outlet end 42 of the support body 38 in general parallel alignment with the flow axis A. Each of the flow-through cells 44 may be at least partially defined by a wall surface 46, shown best in FIG. 3, over which a respective portion of the flow of engine-out exhaust 14 passes while traversing the support body 38. A tight fit between the support body 38 and the hollow chamber 32 ensures that the flow-through cells 44 communicate most of the flow of engine-out exhaust 14 from the inlet 34 to the outlet 36 of the canister 30. The support body 38 may be formed from a ceramic or other material capable of withstanding the potentially high temperatures often associated with the flow of engine-out exhaust 14.

Figure 3:
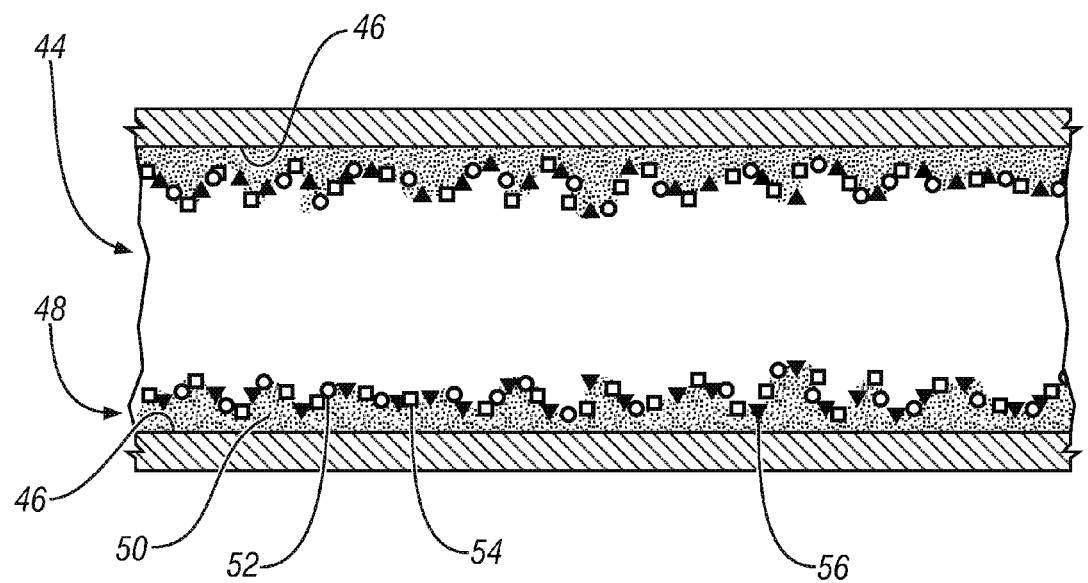
FIG. 3 is a partial magnified view of the lean $NO_X$ trap shown in FIG. 2 that depicts, in an idealized manner, a catalyst material carried by the support body according to one embodiment of the invention.

A catalyst material 48, as shown best in FIG. 3, may be carried on the wall surface 46 of one or more of the plurality of flow-through cells 44 to facilitate the removal of $NO_X$ gases from the flow of engine-out exhaust 14. The catalyst material 48 may comprise a carrier material 50 loaded with a $NO_X$ oxidation catalyst 52, a $NO_X$ storage catalyst 54, and a $NO_X$ reduction catalyst 56. Each of the catalysts 52, 54, 56, as shown, may be substantially homogeneously mixed and evenly dispersed on the carrier material 50. But other catalyst loading configurations are certainly possible. The catalysts 52, 54, 56 may, as an alternative option, be dispersed on the carrier material 50 so that a higher concentration of the $NO_X$ oxidation catalyst 52 is present near the inlet end 40 of the support body 38 and a higher concentration of the $NO_X$ reduction catalyst 56 is present near the outlet end 42.

The carrier material 50 may be directly washcoated onto the wall surface 46 of the one or more flow-through cells 44. The carrier material 50 may completely or partially cover the wall surface 46, and may exhibit a relatively high surface area with many loading or dispersion sites for accommodating the $NO_X$ oxidation, storage, and reduction catalysts 52, 54, 56. The surface area of the carrier material 50 may range, for example, from about 20 m²/gram to about 300 m²/gram. In one embodiment, the carrier material 50 may comprise a high-surface area mixed cerium and zirconium oxide material ($CeO_2$—$ZrO_2$). Such a material offers not only a high-surface area but also some additional relevant functionality. A variety of $CeO_2$—$ZrO_2$ materials, for instance, have demonstrated some ability to enhance the storage of $NO_2$ at low temperatures, stabilize certain catalysts so that loading requirements can be reduced, and promote the water-gas shift reaction that converts CO and $H_2O$ into $CO_2$ and $H_2$. The carrier material 50 may also comprise alumina ($Al_2O_3$) or a zeolite either alone or in combination with a $CeO_2$—$ZrO_2$ material.

The $NO_X$ oxidation catalyst 52 may comprise a perovskite compound defined by the general formula $ABO_3$ where "A" and "B" are complimentary cations of different sizes that coordinate with oxygen anions. A unit cell of the perovskite compound's $ABO_3$ crystal structure may feature a cubic closest packing arrangement with the "A" cation, which is generally the larger of the two cations, centrally located and surrounded by eight "B" cations located in the octahedral voids of the packing arrangement. The "A" and "B" cations in such a packing arrangement respectively coordinate with twelve and six oxygen anions. The unit cell of the perovskite compounds $ABO_3$ crystal structure, however, is not necessarily limited to a cubic closest packing arrangement. Certain combinations of the "A" and "B" cations may indeed deviate from the cubic closest packing arrangement and assume, for instance, an orthorhombic, rhombohedral, or monoclinic packing structure. Small amounts of the "A" and "B" cations of the perovskite compound may also be substituted with different, yet similar sized, "A" and "B" cations such that the perovskite compound is represented by the general formula $A1_X A2_{1-X} BO_3$, where $X \leq 1$.

A great many perovskite compounds are possible for use as the $NO_X$ oxidation catalyst 52 since no fewer than 27 cations may be employed as the "A" cation and no fewer than 36 cations may be employed as the "B" cation. A listing of the cations most frequently employed as the "A" cation includes those of calcium (Ca), strontium (Sr), barium (Ba), bismuth (Bi), cadmium (Cd), cerium (Ce), lead (Pb), yttrium (Y), and lanthanum (La) while a listing of the cations most commonly employed as the "B" cation includes those of cobalt (Co), titanium (Ti), zirconium (Zr), niobium (Nb), tin (Sn), cerium (Ce), aluminum (Al), nickel (Ni), chromium (Cr), manganese (Mn), copper (Cu), and iron (Fe). The $NO_X$ oxidation catalyst 52 may include only a single perovskite compound or a mixture of two or more different perovskite compounds. Some specific and exemplary perovskite compounds that may constitute all or part of the $NO_X$ oxidation catalyst 52 include $LaCoO_3$, $La_{0.9}Sr_{0.1}CoO_3$, $LaMnO_3$, and $La_{0.9}Sr_{0.1}MnO_3$.

The perovskite compound can catalytically oxidize NO to $NO_2$ when exposed to the flow of engine-out exhaust 14 just as efficiently as conventional PGM metals such as platinum. While not wishing to be bound by theory, it is believed that the perovskite compound donates an oxygen anion to an NO molecule to enable the formation of $NO_2$ while temporarily forming an oxygen vacancy in its crystal structure. Oxygen contained in the flow of engine-out exhaust 14 then disassociates to fill that oxygen vacancy and possibly oxidize an additional NO molecule. The ability of the perovskite compound(s) to efficiently oxidize NO to $NO_2$ may significantly diminish or altogether eliminate the need to include platinum in the catalyst material 48. The catalyst material 48 may, as a result, include only trace amounts of platinum or no platinum at all.

The $NO_X$ storage catalyst 54 and the $NO_X$ reduction catalyst 56 may be any suitable material known to skilled artisans. The $NO_X$ storage catalyst 54 may generally comprise any compound that can trap and store $NO_2$ in the oxidizing environment promoted by the combustion of the lean A/F mixture 22 and, conversely, release $NO_X$ gases in the reducing environment promoted, for example, by the combustion of the rich A/F mixture 28. A number of alkali or alkaline earth metal compounds operate in such a fashion through the reversible formation of a nitrate species and, as such, may constitute all or part of the $NO_X$ storage catalyst 54. Some specific and exemplary alkali or alkaline earth metal compounds that may be employed include BaO, $BaCO_3$, and $K_2CO_3$. The $NO_X$ reduction catalyst 56 may generally comprise any compound that can reduce $NO_X$ gases in the reducing environment promoted, for example, by the combustion of the rich A/F mixture 28. Rhodium is an example of a material that may constitute all or part of the $NO_X$ reduction catalyst 56.

Other materials may also be dispersed on the carrier material 50 that have other catalytic functions or serve some other practical or performance-related purpose. Palladium, for example, can help oxidize any residual HC's and CO present in the flow of engine-out exhaust 14 as well as slow the rate of perovskite sulfur poisoning that may occur when sulfur-containing fuels are combusted in the lean-burn engine 12.

The $NO_X$ oxidation, storage, and reduction catalysts 52, 54, 56 work together to convert $NO_X$ gases largely into $N_2$ in the one or more flow-through cells 44 through a multi-part reaction mechanism. The conversion of $NO_X$ gases to $N_2$ begins when the $NO_X$ oxidation catalyst 52 oxidizes NO contained in the flow of engine-out exhaust 14 into $NO_2$. This oxidation reaction occurs when the lean-burn engine 12 receives and combusts the lean A/F mixture 22 which, in turn, renders the flow of engine-out exhaust 14 more favorable to oxidation. At the same time the $NO_X$ storage catalyst 54 traps and stores both the originally-present and newly-generated $NO_2$ as a nitrate species. The oxidation of NO and the storage of $NO_2$ can occur until the $NO_X$ storage catalyst 54 reaches its $NO_X$ storage capacity. The $NO_2$-derived nitrate species stored in the $NO_X$ storage catalyst 54 may then be removed to permit the continued removal of $NO_X$ gases from the flow of engine-out exhaust 14. The release of $NO_X$ gases from the $NO_X$ storage catalyst 54, and the simultaneous regeneration of future $NO_2$ storage sites, may be accomplished by momentarily supplying the lean-burn engine 12 with the rich A/F mixture 28 for combustion instead of the lean A/F mixture 22. This fresh injection of additional fuel makes the flow of engine-out exhaust 14 more favorable to reduction and, as a result, renders the $NO_X$-derived nitrate compounds thermodynamically unstable causing the liberation of $NO_X$ gases. Then, to complete the conversion of $NO_X$ gases to $N_2$, the $NO_X$ reduction catalyst 56 reduces the liberated $NO_X$ gases largely to $N_2$ in the presence of excess reductants contained in the flow of the engine-out exhaust 14. The excess reductants that participate in this reaction include CO, HC's and $H_2$. Once the regeneration of the $NO_X$ storage catalyst 54 is satisfactorily achieved, the lean A/F mixture 22 may be restored to the lean-burn engine 12 and the cycle repeated. The catalyst material 48 can thus cumulatively strip a substantial portion of the $NO_X$ gases from the flow of engine-out exhaust 14, in exchange for $N_2$, while the engine-out exhaust 14 navigates the flow-through cells 44 from the inlet end 40 to the outlet end 42 of the support body 38.

The amount of the $NO_X$ oxidation, storage, and reduction catalysts 52, 54, 56 that are loaded onto the carrier material 50 can vary based on a number of factors. But in one embodiment of the catalyst material 48, in which the loading of each material is reported in grams per liter of combined volume of the flow-through cells 44 in which the catalyst material 48 is located, the carrier material 50 may be present in an amount that ranges from about 100 g/L to about 200 g/L, the $NO_X$ oxidation catalyst 52 may be present in an amount that ranges from about 50 g/L to about 150 g/L, the $NO_X$ storage catalyst 54 may be present in an amount that ranges from about 10 g/L to about 50 g/L, and the $NO_X$ reduction catalyst 56 may be present in an amount that ranges from about 0.10 g/L to about 0.30 g/L. Palladium, if included, may be present in an amount that ranges from about 1.0 g/L to about 5.0 g/L. A specific example of the catalyst material 48 may comprise about 120 g/L of $CeO_2$—$ZrO_2$ with a Ce/Zr mol ratio of 75/25 as the carrier material 50, about 100 g/L of $La_{0.9}Sr_{0.1}MnO_3$ as the $NO_X$ oxidation catalyst 52, about 30 g/L of BaO as the $NO_X$ storage catalyst 54, about 0.18 g/L of rhodium as the $NO_X$ reduction catalyst 56, and about 1.8 g/L of palladium. Other loading requirements may of course be employed, especially if some other combination of catalysts is used to construct the catalyst material 48 or if other materials are included therein. Skilled artisans will nonetheless be capable of determining the appropriate loading amounts of the carrier material 50 and the catalysts 52, 54, 56 that may be included in the catalyst material 48 through experience and/or routine experimentation.

Figure 4:
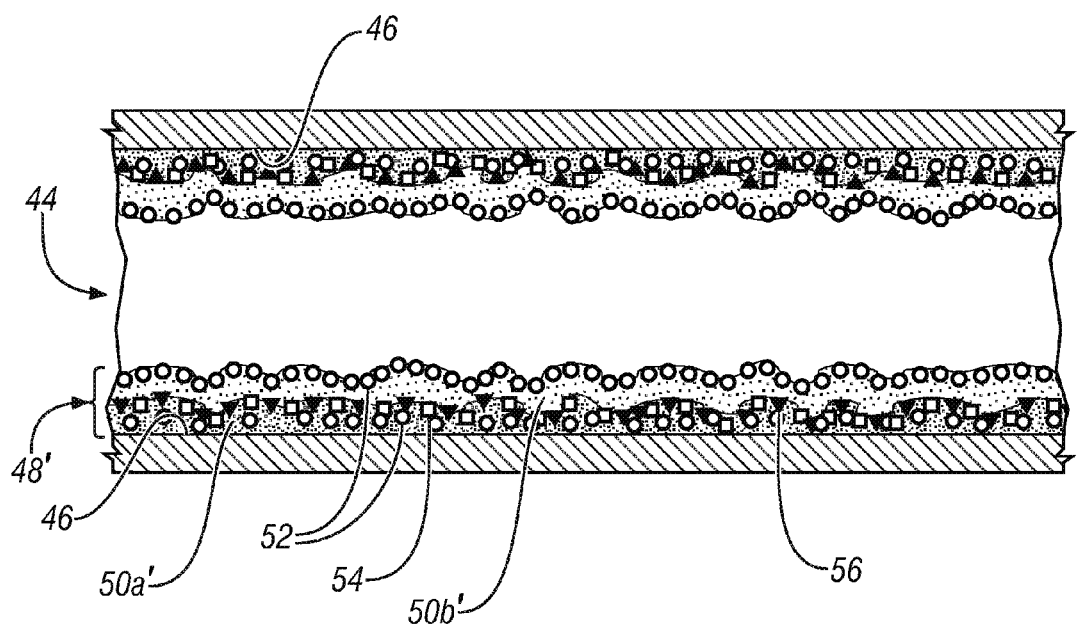
FIG. 4 is a partial magnified view of the lean $NO_X$ trap shown in FIG. 2 that depicts, in an idealized manner, a catalyst material carried by the support body according to one embodiment of the invention.

An alternative embodiment of the catalyst material, depicted as numeral 48', is shown in FIG. 4. This embodiment is similar in many respects to the embodiment shown in FIG. 3 and, as such, similar reference numerals are used to designate similar materials and/or structural details. The catalyst material 48' of this embodiment includes the same catalysts 52, 54, 56 and removes $NO_X$ gases from the flow of engine-out exhaust 14 by way of the same catalytic mechanisms explained with respect to the catalyst material 48 described before. One difference here, however, is that the catalyst material 48' embodies a multi-layer construction.

The catalyst material 48' of this embodiment, as shown, may comprise a first carrier material 50a' adjacent to the wall surface 46 of the one or more flow-through cells 44 and a second carrier material 50b' overlying the first carrier material 50a'. The first and second carrier materials 50a', 50b' may be discrete material layers that have the same or different compositions. The $NO_X$ oxidation catalyst 52 may be dispersed on both the first and the second carrier materials 50a', 50b' to make it available for NO oxidation throughout the catalyst material 48'. The $NO_X$ storage and reduction catalysts 54, 56 may be dispersed on the first carrier material 50a' to perform their respective catalytic functions. The absence of the $NO_X$ storage and reduction catalysts 54, 56 from the second carrier material 50b', while not mandatory, can help promote the catalytic reactions taking place in the catalyst material 48' and also help manage the movement of NO, $NO_2$, and $N_2$ between the catalyst material 48' and the flow of engine-out exhaust 14. Palladium may also be included in either of the first or second carrier materials 50a', 50b' if desired. But in some instances, as shown here, palladium may only need to be dispersed on the second carrier layer 50b' in order to sufficiently perform its intended functions. It should be noted that the exposure of the $NO_X$ oxidation, storage, and reduction catalysts 52, 54, 56, as well as the palladium, if present, to the flow of engine-out exhaust 14 is not significantly inhibited by the multi-layer construction of the catalyst material 48'. This is because the portion of the flow of engine-out exhaust 14 that traverses each flow-through cell 44 can readily permeate and diffuse through both the first and second carrier materials 50a', 50b' with little resistance.

The amount of the $NO_X$ oxidation, storage, and reduction catalysts 52, 54, 56 that are loaded onto the first and second carrier materials 50a', 50b' can vary based on a number of factors. The total amounts of materials used to make the catalyst material 48' of this embodiment may generally be the same as the catalyst material 48 described earlier. A specific example of the catalyst material 48' may comprise a mixture of about 40 g/L of $Al_2O_3$ and about 60 g/L of $CeO_2$—$ZrO_2$ (Ce/Zr mol ratio of 75/25) as the first carrier material 50a' and about 90 g/L of $Al_2O_3$ as the second carrier material 50b' (total of 190 g/L of carrier material in the catalyst material 48'). The catalyst material 48' may also comprise about 30 g/L of $La_{0.9}Sr_{0.1}MnO_3$ dispersed on each of the first and carrier materials 50a' 50b' to serve as the $NO_X$ oxidation catalyst 52 (total of about 60 g/L of $NO_X$ oxidation catalyst in the catalyst material 48'), about 10 g/L of BaO and about 0.18 g/L of rhodium dispersed on first carrier material 50a' to serve as the $NO_X$ storage catalyst 54 and the $NO_X$ reduction catalyst 56, respectively, and about 3.5 g/L of palladium dispersed on the second carrier material 50b', where the loading of each material is once again reported in grams per liter of combined volume of the flow-through cells 44 in which the catalyst material 48' is located. Other loading requirements, like before, may also be employed.

A method of using the lean $NO_X$ trap 20 comprising the catalyst material 48, 48' in the exhaust aftertreatment system 10, or variations of the exhaust aftertreatment system 10, should be apparent to a skilled artisan given the above disclosure. The method of use includes supplying the lean A/F mixture 22 to the lean-burn engine 12 for combustion by way of the inlet manifold 24. The lean A/F mixture 22 combusts inside the lean-burn engine 12 and the flow of engine-out exhaust 14 is communicated from the exhaust manifold 26 to the exhaust aftertreatment system 10. The lean $NO_X$ trap 20, which may embody the specific construction described above, receives the flow of engine-out exhaust 14 at the inlet 34 of the canister 30. The flow of engine-out exhaust 14 passes from the inlet 34 to the outlet 36 and traverses the support body 38 through the plurality flow-through cells 44. The catalyst material 48, 48' carried on the wall surface 46 of one or more of the plurality of flow-through 44 cells oxidizes NO to $NO_2$ and stores $NO_2$ as a nitrate species. The method of use then includes supplying the rich A/F mixture 28 to the lean-burn engine 12 to regenerate the catalyst material 48, 48'. The introduction of rich-burn engine effluents into the flow of engine-out exhaust 14 causes the release of $NO_X$ gases from the catalyst material 48, 48' and the reduction of those $NO_X$ gases largely to $N_2$. The newly-generated $N_2$ is captured by the flow of engine-out exhaust 14 and carried out of the canister 30 through the outlet 36. Next, the method of use includes ceasing the supply of the rich A/F mixture 28 to the lean-burn engine 12 and reinstating the flow of the lean A/F mixture 22.

EXAMPLE

A specific and exemplary embodiment of the catalyst material includes a $CeO_2$—$ZrO_2$ carrier material loaded with $La_{0.9}Sr_{0.1}MnO_3$ as the $NO_X$ oxidation catalyst, BaO as the $NO_X$ storage catalyst, rhodium as the $NO_X$ reduction catalyst, and palladium.

A quantity of $La_{0.9}Sr_{0.1}MnO_3$ was prepared by a citric acid method. First, appropriate amounts of $La(NO_3)_3 \cdot 6H_2O$, 50% $Mn(NO_3)_2$ solution, and $Sr(NO_3)_2$ were dissolved in distilled water with citric acid monohydrate. Citric acid was then added to the solution in 10 wt. % excess to ensure complete complexation of the metal ions. The solution was stirred for 1 hour at room temperature. Next, the solution was heated to 80° C. under continuous stirring to slowly evaporate the water until the solution became a viscous gel and started evolving $NO/NO_2$ gases. The gel was then placed overnight in an oven set at 90° C. The resulting spongy material was crushed and calcined at 700° C. for about 5 hours in static air to form the perovskite oxide.

A quantity of $CeO_2$—$ZrO_2$ loaded with Pd—Rh and BaO was prepared by a conventional incipient wetness impregnation method. Pursuant to this method, $Pd(NO_3)_2$, $Rh(NO_3)_3$, and $Ba(CH_3COO)_2$ were co-impregnated onto $CeO_2$—$ZrO_2$ (Ce/Zr mol ratio of 75/25) to give a loading of 20 wt. % BaO, 1.6 wt. % Pd, and 0.16 wt. % Rh. The Pd—Rh/BaO/$CeO_2$—$ZrO_2$ material was then dried at 120° C. overnight and, afterwards, calcined at 550° C. for about 5 hours.

A slurry of the $La_{0.9}Sr_{0.1}MnO_3$ and the Pd—Rh/BaO/$CeO_2$—$ZrO_2$ was then ball-milled together for about 18 hours. The pH of the slurry was maintained at approximately 9.0 by adding aqueous ammonia as needed. After ball-milling, the slurry was washcoated onto a monolithic honeycomb core sample. The core sample had a length of 1 inch, a diameter of 0.75 inches, and a flow-through cell density of about 600 flow-through cells per square inch with each cell having a wall thickness of about 0.003 inches. The targeted total loading for the catalyst material was 250 g/L with 30 g/L BaO, 100 g/L $La_{0.9}Sr_{0.1}MnO_3$, 1.8 g/L Pd, 0.18 g/L Rh, and the balance $CeO_2$—$ZrO_2$, where the measurement of L refers to the total flow-through volume available for gas transport through the core sample. After washcoating, the catalyst material was dried and calcined at 550° C. for about 5 hours in static air.

The catalyst material was then evaluated after being hydrothermally pre-treated in an oven at 750° C. with 10 wt. % $H_2O$/air for about 72 hours. The monolithic honeycomb core sample was tested in a vertical quartz tubular reactor operated at atmospheric pressure. A gas manifold coupled to the reactor included three banks of flow controllers that provided various gases to the reactor. The first bank, representing a rich feed, provided a feed gas that contained 1 mol % $H_2$, 3 mol % CO, and the balance $N_2$ at a total flow rate of 1.0 L/min. The second bank, representing a lean feed, provided a feed gas that contained 10 mol % $O_2$ and the balance $N_2$ at a total flow rate of 1.0 L/min. A solenoid valve cycled the flow of feed gas to the reactor at a frequency of 60 seconds from the second bank (lean) and 5 seconds from the first bank (rich). The third bank, which was not cycled, provided a feed gas at a flow rate of 2 L/min that contained NO, $CO_2$, and $N_2$ in mol percent proportions generally consistent with a diesel engine exhaust gas composition. The total flow rate to the reactor was thus 3

L/min (on a dry basis) corresponding to a space velocity of 50,000 h$^{-1}$. The following table summarizes the feed gas testing conditions.

| Model Gas Component Table | | |
|---|---|---|
| | Lean Condition | Rich Condition |
| NO | 200 ppm | 200 ppm |
| $O_2$ | 10 mol % | 0 mol % |
| $H_2O$ | 10 mol % | 10 mol % |
| $CO_2$ | 10 mol % | 10 mol % |
| $H_2$ | 0 mol % | 1 mol % |
| CO | 0 mol % | 3 mol % |
| $N_2$ | balance | balance |
| Duration | 60 seconds | 5 seconds |
| Space Velocity | 50,000 h$^{-1}$ | 50,000 h$^{-1}$ |

Figure 5:
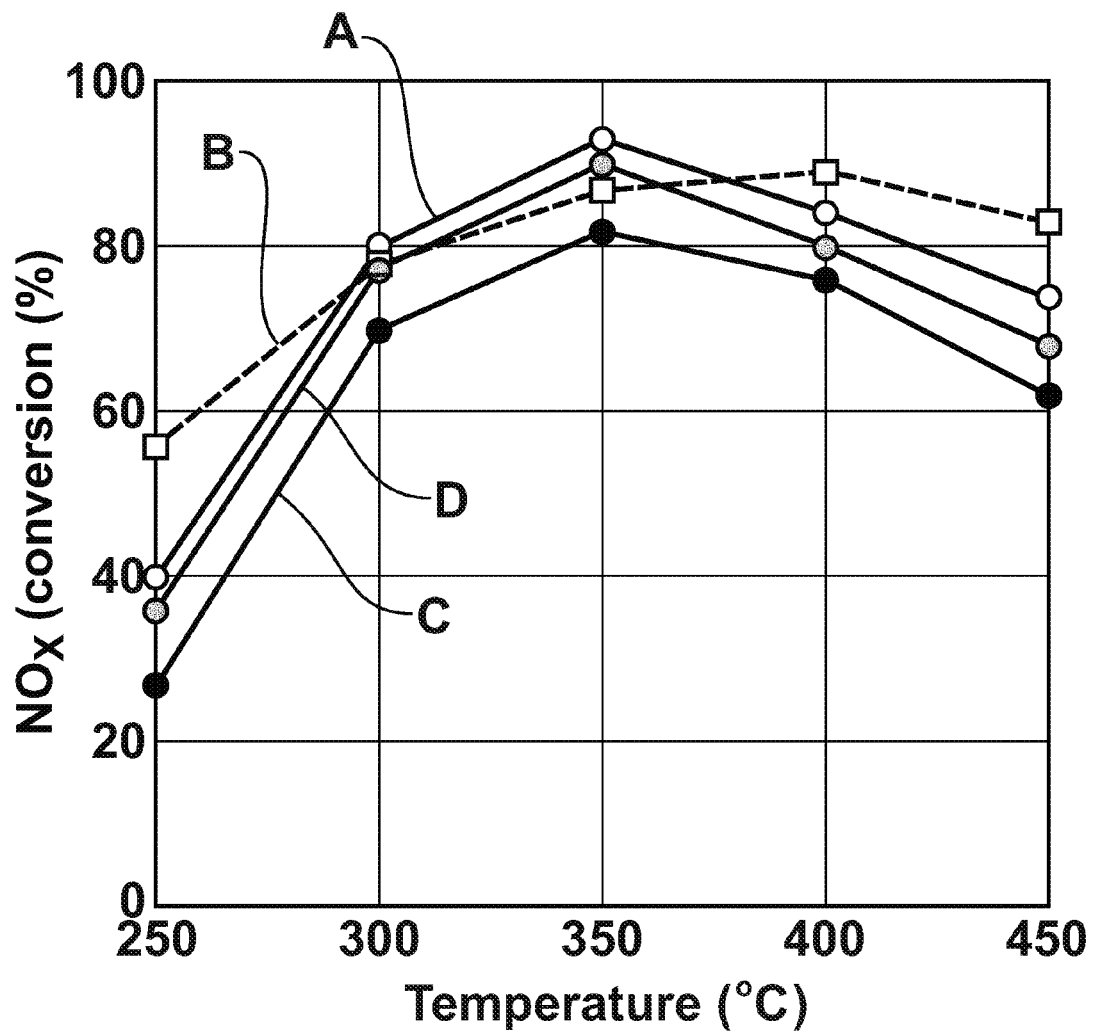
FIG. 5 is a graph that shows the $NO_X$ conversion profile of an exemplary catalyst material under a variety of operation conditions as well as the $NO_X$ conversion profile of a conventional LNT catalyst material.

The overall $NO_X$ conversion profile of the catalyst material when subjected to various gas feed temperatures in the reactor is shown as line A in FIG. 5. The $NO_X$ conversion data was calculated by the following formula using the concentrations of NO and $NO_2$ as reported by an FTIR analyzer.

$$x(\%) = \frac{[\text{Average of inlet }(NO_x) - \text{Average of outlet }(NO_x)]}{\text{Average of inlet }(NO_x)} \times 100$$

The $NO_X$ conversion profile of a commercial LNT catalyst loaded on the same type of monolithic honeycomb core structure, when subjected to the same reactor conditions, is shown as line B. The commercial catalyst included a PGM catalyst loading of 2.06 g/L (1.6 g Pt/0.28 g Pd/0.18 g Rh) where the measurement of L, like before, refers to the total flow-through volume available for gas transport through the core sample. As shown in FIG. 5, the performance of the catalyst material with $La_{0.9}Sr_{0.1}MnO_3$ is thus quite comparable to that of the commercial LNT catalyst that includes a relatively large amount of platinum.

FIG. 5 also shows the $NO_X$ conversion profiles of the catalyst material after sulfur loading and after desulfation. Sulfur was deposited on the catalyst material by first supplying the reactor with the lean feed gas (from the second bank) additionally containing 8 ppm $SO_2$ for 2 hours at 300° C. This resulted in a sulfur exposure of 1 gram sulfur per liter of catalyst material. The sulfur-loaded catalyst material was then evaluated in the reactor similar to before. The $NO_X$ conversion profile of the sulfur-loaded catalyst material is shown as line C. Desulfation of the catalyst material was then achieved by supplying the reactor with the rich feed gas (from the first bank) using a temperature ramp from 300° C. to 700° C. at 10° C./minute followed by soaking at 700° C. for 30 minutes. The desulfated catalyst material was then evaluated in the reactor similar to before. The $NO_X$ conversion profile of the desulfated catalyst material is shown as line D.

The above description of embodiments is merely exemplary in nature and, thus, variations thereof are not to be regarded as a departure from the spirit and scope of the invention.

The invention claimed is:

1. A lean $NO_X$ trap for incorporation into an exhaust aftertreatment system, the lean $NO_X$ trap comprising:
   a diesel particulate trap comprising a monolithic honeycomb structure having a plurality of flow-through cells, and a catalyst material carried by the monolithic honeycomb structure, the catalyst being constructed and arranged to remove nitrogen oxide gases ($NO_X$) contained in a flow of engine-out exhaust emitted from a lean-burn engine that is supplied with a mixture of air and fuel, the catalyst material comprising a $NO_X$ oxidation catalyst that comprises a perovskite compound for catalytically oxidizing NO to $NO_2$ when the mixture of air and fuel is lean, wherein the catalyst material further comprises a carrier material on which the $NO_X$ oxidation catalyst is dispersed, wherein the catalyst material further comprises a $NO_X$ storage catalyst that stores $NO_2$ as a nitrate species when the mixture of air and fuel is lean and releases $NO_X$ gases when the mixture of air and fuel is rich, a $NO_X$ reduction catalyst that reduces $NO_X$ gases to $N_2$ when the mixture of air and fuel is rich, and palladium, and wherein the $NO_X$ storage catalyst, the $NO_X$ reduction catalyst, and the palladium are dispersed on the carrier material with the $NO_X$ oxidation catalyst.

2. The lean $NO_X$ trap according to claim 1, wherein the carrier material comprises at least one of a $CeO_2$—$ZrO_2$ material, alumina, or a zeolite.

3. The lean $NO_X$ trap according to claim 1, wherein the $NO_X$ storage catalyst comprises an alkali or alkaline earth metal oxide and the $NO_X$ reduction catalyst comprises rhodium.

4. The lean $NO_X$ trap according to claim 1, wherein the catalyst material further comprises a first carrier material and a second carrier material overlying the first carrier material, wherein the $NO_X$ oxidation catalyst is dispersed on each of the first and second carrier materials, the catalyst material further comprising a $NO_X$ storage catalyst that stores $NO_2$ as a nitrate species when the mixture of air and fuel is lean and releases $NO_X$ gases when the mixture of air and fuel is rich, a $NO_X$ reduction catalyst that reduces $NO_X$ gases to $N_2$ when the mixture of air and fuel is rich, and palladium, and wherein the $NO_X$ oxidation catalyst and the $NO_X$ storage catalyst are dispersed on the first carrier material and the palladium is dispersed on the second carrier material.

5. The lean $NO_X$ trap according to claim 4, where n each of the first and second carrier materials comprises at least one of a $CeO_2$—$ZrO_2$ material, alumina, or a zeolite, and wherein the $NO_X$ storage catalyst comprises an alkali or alkaline earth metal oxide and the $NO_X$ reduction catalyst comprises rhodium.

6. The lean $NO_X$ trap according to claim 1, wherein the $NO_X$ oxidation catalyst comprises at least one of $LaCoO_3$, $LaMnO_3$, $La_{0.9}S_{0.1}CoO_3$, or $La_{0.9}Sr_{0.1}MnO_3$.

7. The lean $NO_X$ trap according to claim 1, wherein the catalyst material includes only trace amounts of platinum or less.

8. A lean $NO_X$ trap for incorporation into an exhaust aftertreatment system for a lean-burn engine that is supplied with and combusts a mixture of air and fuel, the lean $NO_X$ trap comprising;
   a canister that comprises a hollow chamber, an inlet for receiving a flow of engine-out exhaust from the lean-burn engine and introducing the flow of engine-out exhaust to the hollow chamber, and an outlet for delivering the flow of engine-out exhaust from the hollow chamber;
   a support body housed within the hollow chamber and comprising an inlet end near the inlet of the canister, an outlet end near the outlet of the canister, and at least one surface over which at least a portion of the flow of engine-out exhaust passes while the Flow of engine out exhaust traverses the support body from the inlet end to the outlet end; and a catalyst material carried by the at least one surface of the support body that removes nitrogen oxide gases ($NO_X$) contained in the flow of engine-out exhaust, the catalyst material comprising (1) a $NO_X$ oxidation catalyst that catalytically oxidizes NO to $NO_2$ when the flow of engine-out exhaust promotes an oxidizing environment, (2) a $NO_X$ storage catalyst that stores $NO_2$ when the flow of engine-out exhaust promotes an oxidizing environment and releases $NO_X$ gases when the flow of engine-out exhaust promotes a reducing environment, and (3) a $NO_X$ reduction catalyst that reduces $NO_X$ gases to $N_2$ when the flow of engine out exhaust promotes a reducing environment;

wherein the $NO_X$ oxidation catalyst comprises a perovskite compound, the $NO_X$ storage catalyst comprises an alkali or alkaline earth metal oxide, and the $NO_X$ reduction catalyst comprises rhodium, and wherein the catalyst material includes only trace amounts of platinum or less.

9. The lean $NO_X$ trap according to claim 8, wherein the catalyst material further comprises a carrier material on which the $NO_X$ oxidation catalyst, the $NO_X$ storage catalyst, and the $NO_X$ reduction catalyst are dispersed, wherein the carrier material has a surface area ranging from about 20 $m^2$/gram to about 300 $m^2$/gram, and wherein the carrier material comprises at least one of a $CeO_2$—$ZrO_2$ material, alumina, or a zeolite.

10. The lean $NO_X$ trap according to claim 9, wherein the catalyst material further comprises palladium, and wherein the palladium is dispersed on the carrier material with the $NO_X$ oxidation catalyst, the $NO_X$ storage catalyst, and the $NO_X$ reduction catalyst.

11. The lean $NO_X$ trap according to claim 8, wherein the catalyst material further comprises a first carrier material adjacent to the at least one wall surface and a second carrier material overlying the first carrier material, wherein the each of the first and second carrier materials have a surface area ranging from about 20 $m^2$/gram to about 300 $m^2$/gram, wherein each of the first and second carrier materials comprise at least one of a $CeO_2$—$ZrO_2$ material, alumina, or a zeolite, and wherein the $NO_X$ oxidation catalyst is dispersed on each of the first and second carrier materials and the $NO_X$ storage catalyst and the $NO_X$ reduction catalyst are dispersed on first catalyst material.

12. The lean $NO_X$ trap according to claim 11, wherein the catalyst material further comprises palladium, and wherein the palladium is dispersed on the second carrier material.

13. The lean $NO_X$ trap according to claim 8, wherein the $NO_X$ oxidation catalyst comprises at least one of $LaCoO_3$, $LaMnO_3$, $La_{0.9}Sr_{0.1}CoO_3$, or $La_{0.9}Sr_{0.1}MnO_3$.

14. The lean $NO_X$ trap according to claim 8, wherein the $NO_X$ storage catalyst comprises at least one of BaO, $BaCO_3$, or $K_2CO_3$.

15. The lean $NO_X$ trap according to claim 8, wherein the support body is a monolithic honeycomb structure that comprises a plurality of flow-through cells extending from the inlet end of the support body to the outlet end of the support body, each of the plurality of flow-through cells communicating a portion of the flow of engine-out exhaust and being at least partially defined by a wall surface over which the portion of the flow of engine-out exhaust passes when the flow of engine-out exhaust is traversing the support body from the inlet end to the outlet end, and wherein the catalyst material is carried on the wall surface of one or more of the plurality of flow-through cells.

* * * * *